United States Patent [19]

Sin

[11] Patent Number: 5,293,279
[45] Date of Patent: Mar. 8, 1994

[54] CAPSTAN MOTOR CONTROLLER

[75] Inventor: Han-kyun Sin, Suwon, Rep. of Korea

[73] Assignee: SamSung Electronics Co., Ltd., Suwon, Rep. of Korea

[21] Appl. No.: 777,621

[22] Filed: Oct. 16, 1991

[30] Foreign Application Priority Data

Jan. 31, 1991 [KR] Rep. of Korea ............... 91-1863

[51] Int. Cl.$^5$ .............................................. G11B 15/46
[52] U.S. Cl. .................................. 360/73.08; 360/73.04
[58] Field of Search ................ 360/73.04, 73.05, 73.08

[56] References Cited

U.S. PATENT DOCUMENTS

| 4,210,943 | 7/1980 | Nakamura et al. | 360/73.11 |
| 4,338,631 | 7/1982 | Ota | 360/73.05 |
| 4,392,161 | 7/1983 | Ota et al. | 360/10.3 |
| 4,484,235 | 11/1984 | Yokobori et al. | 360/77.13 |

FOREIGN PATENT DOCUMENTS 1499643 10/1991 Fed. Rep. of Germany .

*Primary Examiner*—John S. Heyman
*Attorney, Agent, or Firm*—Robert E. Bushnell

[57] ABSTRACT

A capstan motor controller includes a capstan motor for moving a recording medium, a motor driver for driving the capstan motor, a capstan frequency generator (CFG) for generating a CFG signal according to the rotation of the capstan motor, a speed controller for generating reference pulse trains having different periods in order to control the speed of the capstan motor according to a mode's speed data and designated by a user and a CFG signal, a trapezoid generator for converting the reference pulse train to a trapezoid signal, and a sampling portion for sampling the trapezoid signal according to the CFG signal and supplying the trapezoid signal to the motor driver. By controlling the capstan motor according to digital data, the controller is advantageous in rotating the capstan motor at different speeds according to modes and stabilizing the rotation speed according to those modes.

22 Claims, 2 Drawing Sheets

CAPSTAN MOTOR CONTROLLER

BACKGROUND OF THE INVENTION

The present invention relates to a circuit for controlling a capstan motor that moves magnetic tape in a video recording/playback apparatus using magnetic tape as a recording medium, and more particularly to a circuit for controlling the rotation speed of the capstan motor by modes in which the recording medium is driven at a different speed from a normal speed.

In general, in order to read out a video signal recorded on inclined tracks of magnetic tape during playback, a video recording/playback apparatus using magnetic tape as a recording medium must move the tape by a predetermined track width whenever a video head attached to a drum scans the inclined track of the tape. In other words, the rotation speed of the capstan motor is related to the rotation speed of the drum. The relation is applied to index search and picture search modes besides the playback mode.

During the modes of fast forward (FF), rewind (REW), high speed search, and index search (but not playback), a conventional recording/playback apparatus rotates the capstan motor at a fixed multiple of the playback speed. Further, the capstan motor has a variable speed even though the capstan motor should maintain rotation speed of a certain multiple of playback speed.

SUMMARY OF THE INVENTION

Therefore, it is an object of the present invention to provide a capstan motor controller which is able to precisely drive a capstan motor at different speeds according to modes in a video recording/playback apparatus.

To accomplish the object, the present invention comprises a capstan motor for moving a recording medium, a motor driver for driving the capstan motor, a capstan frequency generator (CFG) for generating a CFG signal according to the rotation of the capstan motor, a speed controller for generating reference pulse trains having different periods in order to control speeds of the captan motor according to the mode's speed data designated by a user and the CFG signal, a trapezoid generator for converting the reference pulse train used to control the speed of the capstan motor to a trapezoid signal, and a sampling portion for sampling the trapezoid signal according to the CFG signal and supplying the trapezoid signal to the motor driver.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
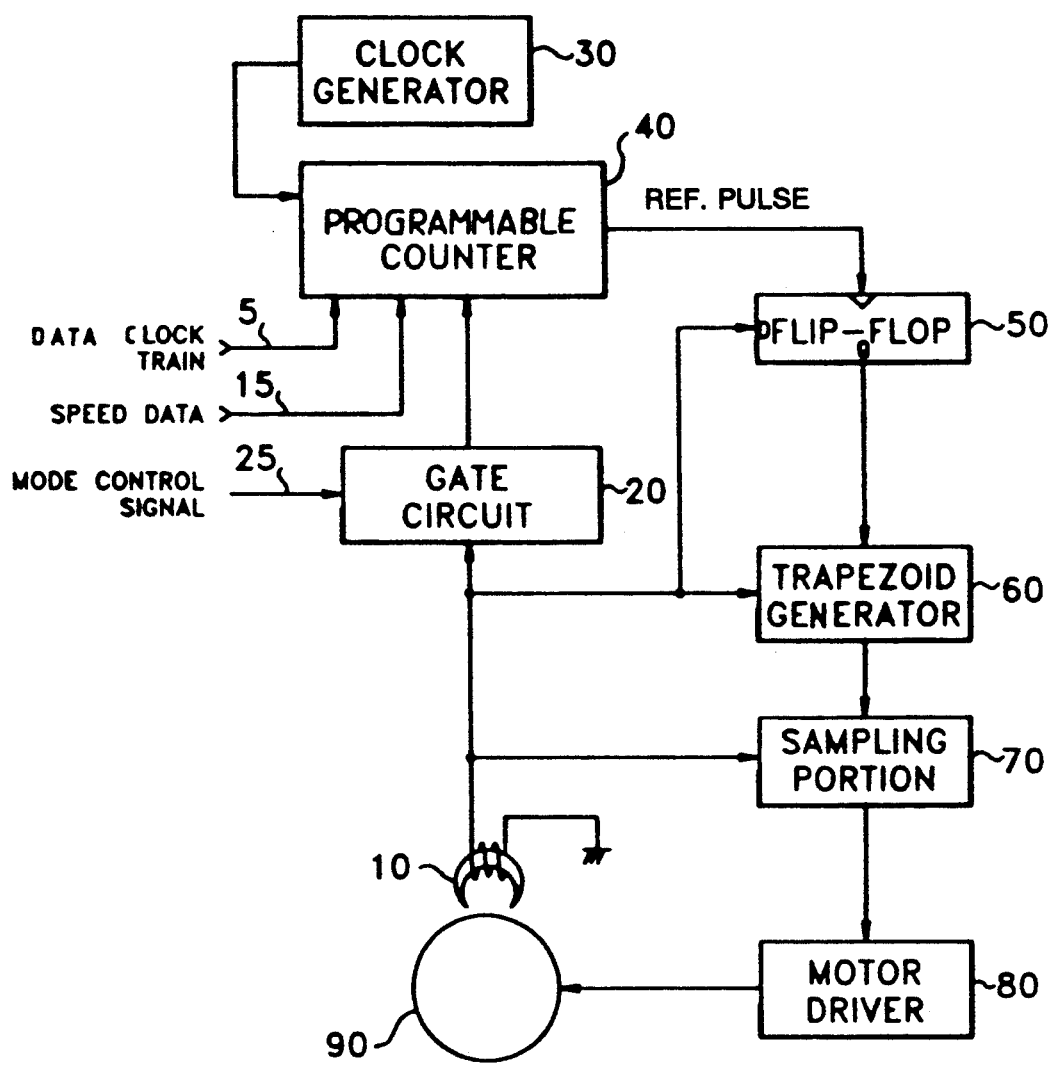
FIG.1 is a circuit diagram of a capstan motor controller of the present invention.

Referring to FIG. 1, a first input port 5 receiving a data clock from a microcomputer (not shown) is coupled to a first input port of programmable counter 40. A second input port 15 receives speed control data from the microcomputer and supplies the data to a second input port of programmable counter 40. A third input port 25 feeds a mode control signal from the microcomputer to the control port of a gate circuit 20. The output port of a clock generator 30 is coupled to a third input port of programmable counter 40. The output of a CFG signal generator 10 is connected to the input port of gate circuit 20, an input port D of a flip-flop 50, a second input of a trapezoid generator 60, and the control port of a sampling portion 70. The output of gate circuit 20 is coupled to a fourth input port of programmable counter 40. The output port of programmable counter 40 supplies a reference pulse to the clock port of flip-flop 50 whose output port Q is coupled to a first input of trapezoid generator 60. The output of trapezoid generator 60 is coupled to the input sort of sampling portion 70 whose output is coupled to the input of a motor driver 80. The output of motor driver 80 drives a capstan motor 90.

Figure 2A:
FIGS. 2A through 2H are waveforms of each component of the circuit shown in FIG. 1.
Figure 2B:
Figure 2C:
Figure 2D:
Figure 2E:
Figure 2F:
Figure 2G:
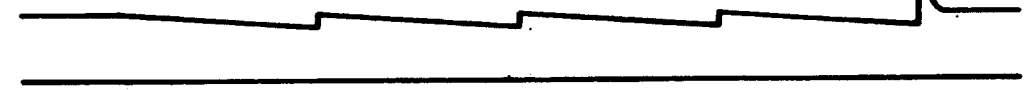
Figure 2H:
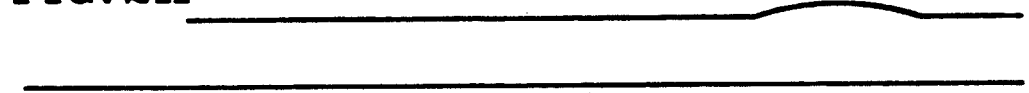

FIG. 2A is a waveform of a CFG signal. FIG. 2B is a waveform of a mode control signal, FIG. 2C is a waveform of the output of gate circuit 20, FIG. 2D is a waveform of the output port of programmable counter 40. FIG. 2E is a waveform of the output of flip-flop 50, FIG. 2F is a waveform of the output of trapezoid generator 60, FIG. 2G is a waveform of the output of sampling portion 70. FIG. 2H is a waveform of the output of motor driver 80.

Referring to FIGS. 1 and 2, CFG signal generator 10 generates a CFG signal as shown in FIG. 2A, whose frequency varies according to the rotation speed of capstan motor 90.

During a mode having a driving speed other than normal speed wherein a "LOW" logic state of a mode control signal as shown in FIG. 2B is input via third input port 25, gate circuit 20 wave-shapes the CFG signal (shown in FIG. 2A) to supply a latch pulse (FIG. 2C) to programmable counter 40. During a mode change or the playback mode wherein the mode control signal is "HIGH", gate circuit 20 stops operating.

Clock generator 30 generates a reference clock train to be used in programmable counter 40, the reference clock train frequency being much larger than that of the CFG signal. The chrominance subcarrier (3.58 MHz) can be used as the reference clock train.

Via second input port 15, programmable counter 40 receives serial speed data synchronized to the data clock train from the first input port 5 when changing from a current mode to another mode with a different driving speed from normal speed. Further, after generating a reference pulse with a pulse width of the reference clock period during the rising edge of a latch pulse generated from gate circuit 20 and input via the fourth input port, programmable counter 40 generates another reference pulse with the pulse width of the reference clock period whenever reference clock consisting of a series of pulses is counted according to the speed data, that is, whenever the time (period T of FIG. 2D) corresponding to the speed data elapses. An expression for generating the reference pulse is represented $$\frac{X}{f_{sc}} = \frac{1}{V \times CFG} - T_o$$

where,

X = N + 2 or the frequency dividing value (N = number of reference clock pulses representing the speed data)

V = multiplying ratio (1.5–13 times normal speed)
CFG = 1079 Hz (normal speed)
fsc = reference clock (3.58 MHz)
To = period of the reference pulse (25µS or set by the designer) generated for every period of speed data by the reference clock (period T in FIG. 2D).

Flip-flop 50 latches the logic value of the CFG signal fed to input port D to the output port Q when a reference pulse generated from programmable counter 40 and input to the clock port CLK is applied, and generates a speed control pulse as shown in FIG. 2E. As shown in FIG. 2E, the period of LOW logic state of the speed control pulse lengthens when changing modes.

While the speed control pulse train is input to the first input port of trapezoid generator 60, trapezoid generator 60 generates a trapezoid signal that increases at a constant inclination from a falling edge of the speed control pulse to its next rising edge, and supplies the trapezoid signal to the input of sampling portion 70. While the speed control pulse train from the flip-flop 50 is not input to the first input port of trapezoid generator 60, trapezoid generator 60 generates a trapezoid signal that increases at a constant inclination from the falling edge of the CFG signal input to the rising edge of the CFG signal, and supplies the trapezoid signal to sampling portion 70. The trapezoid signal has a big value as shown in FIG. 2F when changing mode.

Sampling portion 70 samples the trapezoid signal input to the input port during every rising edge of the CFG signal fed to the control port, and supplies motor driver 80 with a signal sampled as shown in FIG. 2G.

Motor driver 80 processes the signal sampled from sampling portion 70 and supplies driving voltage as shown in FIG. 2H to capstan motor 90.

The capstan motor rotates faster when changing modes due to the driving voltage applied from motor driver 80, then rotates at a stable speed.

As described above, the present invention is advantageous in rotating the capstan motor at different speeds for the respective modes and stabilizing the rotation speed of the capstan motor by modes by controlling the capstan motor according to digital data. The present invention is further advantageous in reducing search time during FF, REW, index search and screen search by expanding the scope of the speed control.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. In a video recording/playback apparatus using tape as a recording medium, a capstan motor controller, comprises:
   a capstan motor for moving said recording medium;
   a motor driver for driving said capstan motor in response to a sampled signal;
   a capstan frequency generator for generating a capstan frequency generator signal having a frequency varying according to rotation of said capstan motor;
   speed designating means for generating speed data corresponding to a running speed of said recording medium according to driving modes of said recording medium;
   a speed controller for generating a reference pulse train having different periods according to said speed data designated by a user and said capstan frequency generator signal;
   a trapezoid generator for converting said reference pulse train into a trapezoid signal; and
   a sampling portion for generating said sampled signal by sampling said trapezoid signal according to said capstan frequency generator signal and supplying said sampled signal to said motor driver.

2. A capstan motor controller as claimed in claim 1, wherein said speed controller comprises a programmable counter for generating said reference pulse train.

3. A circuit for controlling a capstan motor in a recording/playback device, said circuit comprising:
   motor driver means for driving the capstan motor in response to a sampled signal;
   capstan frequency generator means for generating a capstan frequency signal in dependence upon a rotational period of the capstan motor;
   gating means for wave shaping said capstan frequency signal into a latch pulse and disabling generation of said latch pulse in response to a mode control signal;
   speed control means for generating a reference pulse signal in response to said latch pulse, a speed data signal, a data clock signal, and a reference clock signal;
   latch means for latching said capstan frequency signal in response to said reference pulse signal to generate a speed control signal;
   trapezoid generation means for converting said speed control signal to a trapezoid signal; and
   sampling means for sampling said trapezoid signal in response to said capstan frequency signal to generate said sampled signal.

4. The circuit as claimed in claim 3, wherein said mode control signal is in a first state during a mode change and a playback mode, while said mode control signal is in a second state during a mode requiring an alternative driving speed different from a normal driving speed required during said playback mode.

5. The circuit as claimed in claim 3, further comprising clock generation means for generating said reference clock signal in response to a chrominance subcarrier.

6. The circuit as claimed in claim 3, wherein said speed data signal is synchronized to said data clock signal when changing from a current mode to a mode requiring an alternative driving speed.

7. The circuit as claimed in claim 4, wherein said speed data signal is synchronized to said data clock signal when changing from a current mode to a mode requiring said alternative driving speed.

8. The circuit as claimed in claim 3, wherein said speed control means generates said reference pulse signal during a rising edge of said latched signal.

9. The circuit as claimed in claim 7, wherein said speed control means generates said reference pulse signal during a rising edge of said latched signal.

10. The circuit as claimed in claim 3, wherein said trapezoid signal increases at a constant inclination from a falling edge of said speed control signal to a next rising edge of said speed control signal.

11. The circuit as claimed in claim 9, wherein said trapezoid signal increases at a constant inclination from a falling edge of said speed control signal to a next rising edge of said speed control signal.

12. The circuit as claimed in claim 10, wherein said trapezoid signal increases at a constant inclination from a falling edge of said capstan frequency signal to a next rising edge of said capstan frequency signal when said speed control signal is not received by said trapezoid generation mean.

13. The circuit as claimed in claim 11, wherein said trapezoid signal increases at a constant inclination from a falling edge of said capstan frequency signal to a next rising edge of said capstan frequency signal when said speed control signal is not received by said trapezoid generation means.

14. The circuit as claimed in claim 3, wherein said trapezoid signal is sampled by said sampling means during every rising edge of said capstan frequency signal.

15. The circuit as claimed in claim 13, wherein said trapezoid signal is sampled by said sampling means during every rising edge of said capstan frequency signal.

16. A method of controlling a rotation speed of a capstan motor in a recording/playback device, said method comprising:
    detecting said rotation speed of the capstan motor to generate a capstan frequency generator signal;
    generating reference pulse trains;
    generating counts of said reference pulse trains in response to said capstan frequency generator signal and generating reference pulses in response to said counts;
    latching said capstan frequency generator signal in response to said reference pulses to generate a speed control signal;
    generating a trapezoid signal in dependence upon said speed control signal and said capstan frequency generator signal; and
    driving the capstan motor in dependence upon said trapezoid signal.

17. The method as claimed in claim 16, wherein said step of converting said reference pulses comprises:
    increasing an amplitude of said trapezoid signal at a constant inclination in response to said reference pulse to a next rising edge of said capstan frequency generator signal.

18. The method as claimed in claim 16, further comprising latching said reference pulses in response to said capstan frequency generator signal.

19. A capstan motor controller of capstan motor for transporting video tape in a video tape recorder, said controller comprising:
    a capstan frequency generator for generating a capstan frequency generator signal indicative a rotational periods of said capstan motor;
    clock generator for generating reference clock pulse trains;
    programmable counter means for receiving speed data indicative of a driving speed of said video tape corresponding to a selected mode of said video tape recorder, for initiating counts of said reference clocks trains in response to said capstan frequency generator signal, and for generating reference pulses when said counts reach a value determined in response to said speed data;
    a motor driver for generating a driving voltage in response to said reference pulses.

20. A capstan motor controller as claimed in claim 19, further comprising:
    wave generator means for generating trapezoid waveforms in response to said reference pulses; and
    a sampling portion for generating a sample signal received by said motor driver in response to amplitudes of said trapezoid waveforms, said sampled signal for controlling generation of said driving voltage.

21. A capstan motor controller as claim in claim 20, wherein said sampling portion samples said trapezoid waveforms in response to said capstan frequency generator signal.

22. A capstan motor controller as claimed in claim 19, further comprising gate means for shaping said capstan frequency generator signal into latch pulses received by said programmable counter means, and for disabling generation of said latch pulses in response to a mode control signal indicative of a mode change of said video tape recorder.

* * * * *

UNITED STATES PATENT AND TRADEMARK OFFICE
CERTIFICATE OF CORRECTION

PATENT NO. : 5,293,279
DATED : 8 March 1994
INVENTOR(S) : Han-kyun Sin

It is certified that error appears in the above-indentified patent and that said Letters Patent is hereby corrected as shown below:

Column 2,

Line 16,    change "sort" to --port--.

Signed and Sealed this

Twenty-third Day of August, 1994

Attest:

BRUCE LEHMAN

*Attesting Officer*    *Commissioner of Patents and Trademarks*